United States Patent Office 2,921,045
Patented Jan. 12, 1960

2,921,045

BONDING MATERIAL CONTAINING METHACRYLIC ACID AND PARTIALLY POLYMERIZED METHYLMETHACRYLATE

Barbero Di Martino, Los Angeles, Calif., assignor to North American Aviation, Inc.

No Drawing. Application May 5, 1955
Serial No. 506,367

2 Claims. (Cl. 260—45.5)

This invention pertains to a cement and more particularly to a cement suitable for general purpose bonding.

The object of this invention is to provide a general purpose cement which has certain characteristics desirable from a standpoint of handling and use, as well as from strength considerations. It is, of course, a primary object to provide a cement having high strength properties particularly for bonding of thermoplastics as well as fabrics, wood and other materials. Another object is to provide a cement having a high temperature resistance whereby strength is not seriously reduced as temperatures are increased. A further object is to provide a cement having a high resistance to moisture so that a bond will not be attacked by being subjected to moisture in the air or from other sources. Additionally it is an object of this invention to provide a cement having a relatively long pot life whereby it may be feasibly used in production of bonded parts. Furthermore, an object of this invention is to provide a cement which may be mixed and applied at room temperature. These and other objects will become apparent from the following detailed description.

It is known in the prior art that methylmethacrylate monomer can be employed as a bonding cement and has been used in a satisfactory manner for some purposes. Cements of this type are generally used in bonding fabric edge attachments to acrylic sheets, such as aircraft canopies, or in forming an acrylic-to-acrylic joint. The monomeric methylmethacrylate is not of sufficient viscosity to be a practical material for a cement so that it has been common practice to dissolve fully polymerized methylmethacrylate into the liquid methylmethacrylate until a sufficient viscosity has been attained. Inhibitors are added to the monomeric material to prevent premature curing during storage. Such a cement will show satisfactory strength characteristics for relatively low temperatures.

However, other features of such cements severely restrict their application. A serious deficiency is that at relatively high temperatures the strength of the bond formed drops off rapidly. Most of these cements require heat or ultra violet irradiation to effect a cure with attendant expense for equipment and material handling. With a previously known cement of this type which will cure at room temperature the stability after catalyzing is unpredictable and the pot life short. At most thirty minutes may be expected and the cement is accordingly not feasible for most production.

The cement of my invention utilizes the basic material referred to above, but by a particular treatment thereof a much improved result is obtained. The composition of the cement is as follows:

115 parts prebodied methylmethacrylate of 2000 to 2500 cps. viscosity
10 parts methacrylic acid The cement is catalyzed as follows:

.5 to .7% 6% cobalt naphthenate
.7 to .9% methyl ethyl ketone peroxide (a solution 60% in dibutyl phthalate)
.4 to .5% diethylaniline When the cement is prepared in this manner it provides excellent compressive shear, tensile shear, tensile and flexural strengths particularly when employed with plastic materials or fabrics. The strength of the bond it provides with metals is improved from that obtained by the cements of the prior art although it is not regarded as a structural cement for this purpose. However, it does find considerable use with metals where semistructural or nonstructural purposes are to be satisfied. The bond to glass is not as effective as to the thermoplastics and fabrics, but is satisfactory at least for semistructural applications.

The temperature resistance of the cement of this invention has been significantly increased. When used for an edge attachment with an acrylic sheet, in one example the joint has proven satisfactory at temperatures up to about 300° F. This contrasts with results from previously known acrylic cements where a bond of this kind was adequate only to around 225° F. Strengths at extremely low temperatures are also improved with the cement of this invention.

After the catalyst has been added this improved cement has a pot life of from an hour to an hour and fifteen minutes before it sets up, which means that it becomes a material which can be readily used during production bonding operations. Good moisture resistance is also obtained whereby the bonded joints will hold up after protracted periods of exposure. Specimens tested under water spray and constant load for one year showed only a five percent reduction in strength.

The material will set-up at room temperature obtaining a maximum strength in from ten to sixteen hours. However, after two hours an adequate strength will have been obtained to permit shop handling and most machining operations.

Prior to catalyzation the prebodied methyl methylmethacrylate and the methacrylic acid are stored under refrigeration to prevent their curing to a fully set condition. No inhibitors are included. A temperature of 40° F. is adequate for this purpose. When so stored the shelf life is from three to six months.

The precise reason why the cement of this invention yields results which are so much improved over those of previously known cements having the same basic materials is not known. However, the reason apparently centers around the use of prebodied methylmethacrylate rather than a methylmethacrylate monomer into which fully polymerized methylmethacrylate has been dissolved, plus the catalytic system used. With the cement of my invention monomeric methylmethacrylate is polymerized with heat only to where the desired viscosity is obtained and then the reaction is halted. A viscosity of from 2,000 to 2,500 cps. is preferable for the subsequent handling and use of the cement. When such a viscosity is obtained in this manner, the material becomes in effect a partially polymerized monomer containing many intermediate short chain polymers such as dimers, trimers and so forth. These short chain polymers can be cross linked when the material is eventually cured whereby the material is given increased stability and strength. No fully polymerized methylmethacrylate is used in preparing this cement.

However, when fully polymerized methylmethacrylate is dissolved in the methylmethacrylate monomer the long chain polymers of the fully polymerized material cannot subsequently be cross linked with the chains of the monomer as the material is cured. A cement containing fully polymerized methylmethacrylate, therefore, will not be as stable or strong as that provided by this invention. Accordingly, without the prebodied methylmethacrylate the improved results are not achieved.

The methacrylic acid in the cement apparently copolymerizes with the methylmethacrylate forming cross linkage between the polymers of the methylmethacrylate as the cement cures. This will considerably increase the stability of the material and thus raise its resistance to heat. The prebodied methylmethacrylate used with this invention provides short chain polymers which are available for such copolymerization. This is not the case with fully polymerized material.

It is preferred to keep the range of the methacrylic acid content somewhere around that indicated. This material has a considerable attraction for water so that if included in larger quantities the cement will not be sufficiently resistant to moisture. Therefore the methacrylic acid normally should not exceed ten percent by weight of the cement. However, if moisture resistance is no problem in a particular instance, as much as twenty percent of the methacrylic acid may be included and a material of great temperature resistance can be thereby obtained. Another objection, however, to a high content of methacrylic acid is that it is a material of low viscosity whereby the overall viscosity of the cement is decreased and the ease of application of the resulting cement will not be as great.

On the other hand if the methacrylic acid is too low in content the material will have a reduced heat resistance. This drops off so that below five percent of methacrylic acid the heat resistance is regarded as insufficient for general purpose uses.

The catalyzing system employed with this invention is also regarded as important to the results which are obtained. The range for each individual catalyst as noted above must be closely adhered to or the pot life of the cement will be materially altered. If any of the catalysts is changed in quantity to an appreciable degree outside of the range indicated the material may take at least five hours or more in which to become fully polymerized, thereby becoming impractical for normal purposes. In some cases where the proportions of the catalysts are varied the cement does not solidify even after long periods of time.

It can be seen by the foregoing, therefore, that I have provided an improved cement whereby a prebodied methylmethacrylate is employed with a particular catalyst system, which combination gives the necessary characteristics of the final material. Not only are strengths adequate, particularly for bonding to plastics or fabrics, but stability at temperature is high, moisture resistance is obtained, the pot life is adequate and handling is simplified.

The foregoing detailed description is to be clearly understood as given by way of illustration and example, the spirit and scope of this invention being limited only by the appended claims.

I claim:

1. A bonding material comprised of from about five to ten percent by weight of methacrylic acid, and the balance of partially polymerized methylmethacrylate monomer having a viscosity of from about 2000 to 2500 centipoises, catalyzed by about 0.5% to 0.7% of 6% cobalt naphthenate, 0.7% to 0.9% of methyl ethyl ketone peroxide, and 0.4% to 0.5% of diethylaniline.

2. A bonding material comprised of about 115 parts of methylmethacrylate partially polymerized to about 2000 to 2500 centipoises viscosity, and about 10 parts methacrylic acid, catalyzed by about 0.5% to 0.7% of 6% cobalt naphthenate, 0.7% to 0.9% methyl ethyl ketone peroxide, and 0.4% to 0.5% diethylaniline.

References Cited in the file of this patent

UNITED STATES PATENTS

| | | |
|---|---|---|
| 2,256,618 | Kistler et al. | Sept. 23, 1941 |
| 2,346,036 | Leary | Apr. 4, 1944 |
| 2,409,633 | Kropa | Oct. 22, 1946 |
| 2,511,480 | Roedel | June 13, 1950 |
| 2,610,965 | Vandenberg | Sept. 16, 1952 |
| 2,703,776 | Leader | Mar. 8, 1955 |

FOREIGN PATENTS

| | | |
|---|---|---|
| 584,857 | Great Britain | Jan. 24, 1947 |